(12) United States Patent
Cui et al.

(10) Patent No.: US 11,025,963 B2
(45) Date of Patent: Jun. 1, 2021

(54) DATA PROCESSING METHOD, APPARATUS, AND SYSTEM FOR LIVE STREAMING PAGE

(71) Applicant: TENCENT TECHNOLOGY (SHENZHEN) COMPANY LIMITED, Shenzhen (CN)

(72) Inventors: Jin Cui, Shenzhen (CN); Xiaojun Yin, Shenzhen (CN); Zihe Dai, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/282,015

(22) Filed: Feb. 21, 2019

(65) Prior Publication Data

US 2019/0200047 A1   Jun. 27, 2019

Related U.S. Application Data

(63) Continuation of application No. PCT/CN2017/109611, filed on Nov. 7, 2017.

(30) Foreign Application Priority Data

Dec. 6, 2016  (CN) .......................... 201611110592.8

(51) Int. Cl.
    *H04N 21/2187*  (2011.01)
    *H04N 21/414*  (2011.01)
    (Continued)

(52) U.S. Cl.
    CPC ....... *H04N 21/2187* (2013.01); *G06F 16/958* (2019.01); *G06F 16/9577* (2019.01);
    (Continued)

(58) Field of Classification Search
    CPC ......... H04N 21/2187; H04N 21/41407; H04N 21/4438; H04N 21/47202; H04N 21/4825;
    (Continued)

(56) References Cited

U.S. PATENT DOCUMENTS 8,312,486 B1 * 11/2012 Briggs ............... H04N 21/8455
                                                          725/32
2003/0009771 A1 *  1/2003 Chang .............. H04N 21/43615
                                                         725/135
(Continued)

FOREIGN PATENT DOCUMENTS

CN   101141625 A    3/2008
CN   105589932 A    5/2016
(Continued)

OTHER PUBLICATIONS

International Search Report for corresponding PCT/CN2017/109611, dated Jan. 10, 2018.
(Continued)

*Primary Examiner* — Alexander Gee
(74) *Attorney, Agent, or Firm* — Oblon, McClelland, Maier & Neustadt, L.L.P.

(57) ABSTRACT

Embodiments of this application disclose a data processing method, apparatus, and system for a live streaming page. A presentation request is received for the live streaming page. The presentation request includes a live streaming scene identifier. The live streaming scene identifier is determined by a live streaming client according to a running environment of the live streaming client. Scene configuration information corresponding to the live streaming scene identifier is obtained. The scene configuration information includes a correspondence between the live streaming scene identifier and a function plug-in that is configured to provide a predetermined function to a user during display of live (Continued)

streaming content. The live streaming page is generated by adding the function plug-in identified as corresponding to the live streaming scene identifier on a preset basic page according to the scene configuration information. The live streaming page is sent to the live streaming client for presentation.

20 Claims, 6 Drawing Sheets

(51) Int. Cl.
| | |
|---|---|
| *G06F 16/958* | (2019.01) |
| *H04N 21/488* | (2011.01) |
| *H04N 21/472* | (2011.01) |
| *H04N 21/482* | (2011.01) |
| *G06F 16/957* | (2019.01) |
| *H04N 21/443* | (2011.01) |
| *H04N 21/4782* | (2011.01) |

(52) U.S. Cl.
CPC ..... *G06F 16/986* (2019.01); *H04N 21/41407* (2013.01); *H04N 21/4438* (2013.01); *H04N 21/47202* (2013.01); *H04N 21/4825* (2013.01); *H04N 21/4884* (2013.01)

(58) Field of Classification Search
CPC . H04N 21/4884; G06F 16/958; G06F 16/986; G06F 16/9577
See application file for complete search history.

(56) References Cited

U.S. PATENT DOCUMENTS

| | | | | |
|---|---|---|---|---|
| 2007/0250850 | A1* | 10/2007 | Gupta | H04H 60/37 725/24 |
| 2013/0340007 | A1* | 12/2013 | Eyer | H04N 21/4307 725/40 |
| 2014/0101548 | A1* | 4/2014 | Alsina | H04N 21/4307 715/717 |
| 2014/0282698 | A1* | 9/2014 | Makhlouf | H04N 21/4316 725/32 |
| 2014/0359444 | A1* | 12/2014 | Greenberg-Sanders | H04L 51/04 715/716 |
| 2015/0319206 | A1* | 11/2015 | Sanghavi | H04L 67/1078 709/204 |
| 2015/0319505 | A1* | 11/2015 | Patadia | H04N 21/8586 725/34 |
| 2016/0156983 | A1* | 6/2016 | Vong | H04N 21/462 725/47 |

FOREIGN PATENT DOCUMENTS

| | | |
|---|---|---|
| CN | 105898438 A | 8/2016 |
| CN | 106792188 A | 5/2017 |

OTHER PUBLICATIONS

Written Opinion for corresponding PCT/CN2017/109611, dated Jan. 10, 2018 (English translation not provided).

* cited by examiner

DATA PROCESSING METHOD, APPARATUS, AND SYSTEM FOR LIVE STREAMING PAGE

RELATED APPLICATION

This application is a continuation of International Application No. PCT/CN2017/109611, filed on Nov. 7, 2017, which claims priority to Chinese Patent Application No. 201611110592.8, entitled "DATA PROCESSING METHOD, APPARATUS, AND SYSTEM FOR LIVE STREAMING PAGE," filed with the Chinese Patent Office on Dec. 6, 2016. The entire disclosures of the prior applications are hereby incorporated by reference in their entirety.

FIELD OF THE TECHNOLOGY

This application relates to the field of communications technologies for a live streaming page.

BACKGROUND OF THE DISCLOSURE

With the rapid popularization of live streaming on the network, various live streaming clients come into being. In addition to a live streaming watching function, the live streaming clients may further provide various live streaming rooms for streamers to make live streaming. A page on which a user watches live streaming and a page on which a streamer makes live streaming may be collectively referred to as a live streaming page. In addition to a live streaming window, usually, some other operation entries such as a bullet/live commenting screen, a chat window, and/or gift giving are further provided on the streaming page.

SUMMARY

Embodiments of this application provide a data processing method, apparatus, and system for a live streaming page, to improve flexibility and efficiency.

According to an aspect of the embodiments of this application, there is provided a data processing method for a live streaming page, applied to a live streaming server.

In the method, a presentation request is received for the live streaming page. The presentation request includes a live streaming scene identifier. The live streaming scene identifier is determined by a live streaming client according to a running environment of the live streaming client. Scene configuration information corresponding to the live streaming scene identifier is obtained. The scene configuration information includes a correspondence between the live streaming scene identifier and a function plug-in. The live streaming page is generated, by circuitry of the live streaming server, by adding the function plug-in identified as corresponding to the live streaming scene identifier on a preset basic page that includes the live streaming content according to the scene configuration information according to the scene configuration information. The live streaming page with the added function plug-in is sent to the live streaming client for presentation.

According to another aspect of the embodiments of this application, there is provided a data processing apparatus for a live streaming page.

The data processing apparatus includes circuitry and memory coupled to the circuitry. The circuitry receives a presentation request for the live streaming page. The presentation request includes a live streaming scene identifier. The live streaming scene identifier is determined by a live streaming client according to a running environment of the live streaming client. The circuitry obtains scene configuration information corresponding to the live streaming scene identifier. The scene configuration information includes a correspondence between the live streaming scene identifier and a function plug-in. The circuitry generates the live streaming page, by adding the function plug-in identified as corresponding to the live streaming scene identifier on a preset basic page that includes the live streaming content according to the scene configuration information. The circuitry sends the live streaming page with the added function plug-in to the live streaming client for presentation.

In addition, an embodiment of this application further provides a data processing system for a live streaming page, including the data processing apparatus for the live streaming page provided in the embodiments of this application.

According to another aspect of the embodiments of this application, there is provided a non-transitory computer-readable storage medium. The storage medium stores a program executable by a processor to perform the following.

A presentation request is received for the live streaming page. The presentation request includes a live streaming scene identifier. The live streaming scene identifier is determined by a live streaming client according to a running environment of the live streaming client. Scene configuration information corresponding to the live streaming scene identifier is obtained. The scene configuration information includes a correspondence between the live streaming scene identifier and a function plug-in. The live streaming page is generated by adding the function plug-in identified as corresponding to the live streaming scene identifier on a preset basic page that includes the live streaming content according to the scene configuration information. The live streaming page with the added function plug-in is sent to the live streaming client for presentation.

BRIEF DESCRIPTION OF THE DRAWINGS

To describe the technical solutions in the embodiments of this application more clearly, the following briefly describes the accompanying drawings for describing the embodiments or the related technology. The accompanying drawings in the following description show merely some embodiments of this application, and a person skilled in the art may still derive other drawings from these accompanying drawings.

DESCRIPTION OF EMBODIMENTS

The following describes the technical solutions in the embodiments of this application with reference to the accompanying drawings in the embodiments of this application. The described embodiments are merely some but not all of the embodiments of this application. All other embodiments obtained by a person skilled in the art based on the embodiments of this application shall fall within the protection scope of this application.

The embodiments of this application provide a data processing method, apparatus, and system for a live streaming (or broadcast) page.

The data processing system for a live streaming page (briefly referred to as a data processing system) may include any data processing apparatus for a live streaming page provided in the embodiments of this application. The data processing apparatus for a live streaming page may be integrated into a device such as a server. In addition, the data processing system may further include another device, for example, a terminal. A client corresponding to the data processing apparatus for a live streaming page may be installed on the terminal to obtain a (target) live streaming page from the data processing apparatus, and present the (target) live streaming page.

Figure 1A:
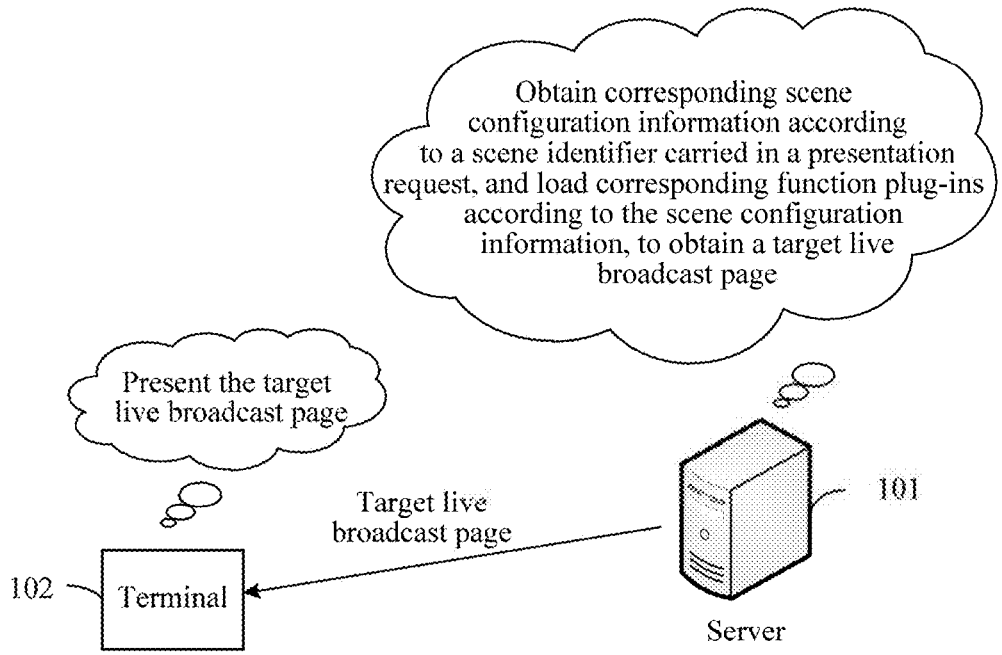
FIG. 1a is a schematic diagram of a scene of a data processing method for a live streaming page according to an embodiment of this application.

For example, referring to FIG. 1a, using an example in which the data processing apparatus for a live streaming page is integrated into a server 101, first, functional modules on a page may be divided into several independent function plug-ins, and scene identifiers are set for different scenes; second, an association relationship between each scene identifier and each piece of information may be established, and the association relationship is stored as scene configuration information, for example, a plug-in list. In this way, when receiving a presentation request for a live streaming page from a terminal 102, the server 101 may obtain corresponding scene configuration information according to a scene identifier carried in the presentation request, for example, obtain a plug-in list, and then, load corresponding function plug-ins on a preset basic page according to the scene configuration information, to obtain a target live streaming page, and send the target live streaming page to a client in the corresponding terminal 102 for presentation. Therefore, function-plug-ins are added and reduced flexibly according to different scene requirements, to generate different live streaming pages.

The following gives detailed descriptions. The embodiments are described from the perspective of the data processing apparatus for a live streaming page. The data processing apparatus for a live streaming page may be specifically integrated into a device such as a server.

A data processing method for a live streaming page includes: receiving a presentation request for a live streaming page, the presentation request carrying a scene identifier, and the scene identifier being determined by a live streaming client according to a running environment of the live streaming client; obtaining scene configuration information corresponding to the scene identifier, the scene configuration information including a correspondence between the scene identifier and corresponding function plug-ins loading the function plug-ins corresponding to the scene identifier on a preset basic page according to the scene configuration information, to obtain a target live streaming page; and sending the target live streaming page to the live streaming client for presentation.

Figure 1B:
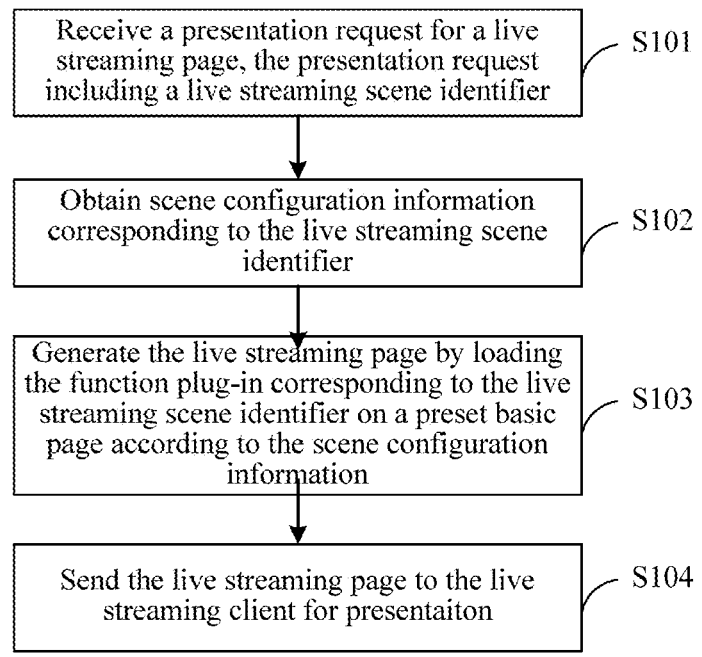
FIG. 1b is a flowchart of a data processing method for a live streaming page according to an embodiment of this application.

As shown in FIG. 1b, a specific process of a data processing method for a live streaming page may be as follows:

In S101, receive a presentation request for a live streaming page, the presentation request including a live streaming scene identifier.

For example, the presentation request that is for the live streaming page and that is sent by a terminal or another device may be specifically received, or the presentation request that is for the live streaming page and that is triggered by a local device (in other words, a data processing apparatus for a live streaming page) may be received.

The scene identifier is used to distinguish between and recognize different running environments of the live streaming page, and may specifically include information such as a name, a code, a number, and/or an icon of the scene. In some embodiments, the running environment may be a type of an application used for opening the live streaming page, for example, WeChat, Microblog, QQ, or a browser.

In S102, obtain scene configuration information corresponding to the live streaming scene identifier.

For example, a core component may be set, to load and initialize other components and each plug-in, and manage a life cycle thereof. In this way, after the presentation request for the live streaming page is received, the corresponding scene configuration information may be obtained by using the core component. In other words, the step of "obtaining scene configuration information corresponding to the scene identifier" may be specifically as follows:

loading a preset core component according to the presentation request, and obtaining the scene configuration information corresponding to the scene identifier by using the core component.

For example, the core component may be used to extract the scene identifier from the presentation request, and obtain the scene configuration information corresponding to the scene identifier.

In some embodiments, a scene determining component and a scene configuration component may be separately set. The scene determining component is mainly configured to distinguish between different scenes, and the scene configuration component is mainly configured to provide scene configuration information corresponding to each scene. In this way, the scene configuration information can be obtained by loading the scene determining component and the scene configuration component. In other words, the step of "obtaining the scene configuration information corresponding to the scene identifier by using the core component" may be specifically as follows:

loading the scene determining component by using the core component, extracting the scene identifier from the presentation request by using the scene determining component, loading the scene configuration component, and obtaining the scene configuration information corresponding to the scene identifier from the scene configuration component.

A correspondence between the scene configuration information and the scene identifier may be pre-stored in the data processing apparatus for a live streaming page, or the data processing apparatus for a live streaming page may establish a correspondence between the scene configuration information and the scene identifier. In other words, before the step of "receiving a presentation request for a live streaming page", the data processing method for a live streaming page may further include:

obtaining a scene setting request, where the scene setting request carries the scene identifier, obtaining multiple pieces of function plug-in information according to the scene setting request, receiving function plug-in information selected by a user from the multiple pieces of function plug-in information, generating the scene configuration information according to the selected function plug-in information, and establishing the correspondence between the scene configuration information and the scene identifier.

In addition, it is noted that the scene configuration information includes related information (referred to as function plug-in information in this embodiment of this application) of at least one function plug-in needing to be loaded. During specific implementation, there may be multiple information formats of the scene configuration information. For example, the scene configuration information may be a text or a list. For the convenience of description, this embodiment of this application is described by using an example in which the scene configuration information is specifically a plug-in list.

In S103, generate the live streaming page by adding/loading the function plug-in identified as corresponding to the live streaming scene identifier on a preset basic page according to the scene configuration information. For example, details may be as follows:

First, rendering is performed on the preset basic page according to the scene configuration information, to obtain a functional structure needed by the corresponding function plug-ins. For example, details may be as follows:

A user interface (UI) management component is invoked, and rendering is performed on the preset basic page according to the scene configuration information by using the UI management component, to obtain the functional structure needed by the corresponding function plug-ins, and the like.

The basic page is a live streaming page obtained before the function plug-ins provided in this embodiment of this application are loaded, and may be specifically set according to a requirement of an actual application, and details are not described herein again.

Then, the corresponding function plug-ins are sequentially loaded according to the functional structure, and the function plug-ins are initialized to obtain the target live streaming page.

In S104, send the (target) live streaming page with the added function plug-in to a live streaming client for presentation.

For example, besides that the target live streaming page may be presented locally, the target live streaming page may be sent to each client for presentation. For example, the target live streaming page may be sent to a terminal to which the client belongs, so that the terminal presents the target live streaming page on a screen.

In addition, after the target live streaming page is presented, each event may be responded to by using each function plug-in on the target live streaming page. In other words, after the step of "presenting the target live streaming page," the data processing method for a live streaming page may further include:

obtaining an event processing request triggered based on the target live streaming page, determining, according to the event processing request, an event needing to be processed, invoking a corresponding function plug-in, and processing the event by using the invoked function plug-in.

In some embodiments, a plug-in on the target live streaming page may further be modified, for example, deleted or added. In other words, after the step of "presenting the target live streaming page," the data processing method for a live streaming page may further include:

obtaining a modification request triggered based on the target live streaming page, where the modification request indicates a function plug-in needing to be deleted or added, and deleting the function plug-in from or adding the function plug-in to the target live streaming page according to the modification request.

As can be learned from the foregoing, in this embodiment, after the presentation request for the live streaming page and carrying the scene identifier is received, the scene configuration information corresponding to the scene identifier may be obtained; then, the corresponding function plug-ins are loaded on the preset basic page according to the scene configuration information, to obtain the target live streaming page, and the target live streaming page is presented. Compared with a related solution in which page differentiation can be implemented only by using hard code, because in this solution, different function plug-in can be flexibly loaded according to different scene requirements to generate different live streaming pages, implementation is simpler and more flexible, development time can be greatly reduced, and the processing efficiency is improved.

The following gives a detailed description by using an example according to the method described in the foregoing embodiment.

This embodiment is described by using an example in which the data processing apparatus for a live streaming page is specifically integrated into a server, and the scene configuration information is specifically a plug-in list.

First, functions on a live streaming page may be divided, and corresponding function plug-ins are set. For example, a "live streaming function." corresponds to a live streaming function plug-in, "bullet screen interaction" corresponds to a bullet screen interaction plug-in, "gift and reward giving" corresponds to a gift and reward giving plug-in, and "live streaming counting" corresponds to a live streaming counting plug-in. Second, corresponding scene identifiers are set for different scenes, an association relationship between each scene identifier and each piece of plug-in information is established, and a plug-in list is established according to the association relationship. In this way, when receiving a presentation request for the live streaming page, the server may obtain a corresponding plug-in list according to the scene identifier carried in the presentation request. Then, corresponding function plug-ins are loaded on a preset basic page based on the plug-in list, to obtain a target live streaming page for presentation.

Figure 2A:
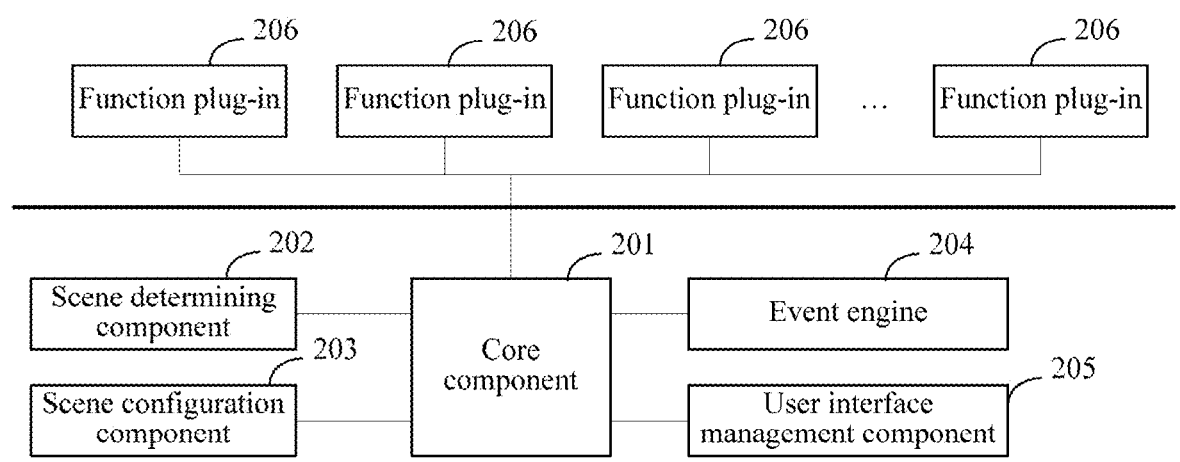
FIG. 2a is a diagram showing a relationship between components in a server according to an embodiment of this application.

Multiple modules may be set in the server, to assist in completing the foregoing operations. For example, referring to FIG. 2a, the server may include multiple modules, for example, a core component 201, a scene determining component 202, a scene configuration component 203, an event engine 204, a UI management component 205, and multiple function plug-ins 206. Functions of the modules are as follows:

The core component 201 is configured to load and initialize other components and each plug-in, and manage a life cycle. For example, the scene determining component, the scene configuration component, the event engine, the UI management component, and the function plug-ins may be specifically loaded by using the core component.

The scene determining component 202 is configured to distinguish between different scenes. For example, the scene identifier may be specifically extracted from the presentation request, and a current scene may be specifically determined according to the scene identifier.

The scene configuration component 203 is configured to provide a plug-in list (in other words, scene configuration information) corresponding to each scene. For example, the plug-in list corresponding to the scene identifier may be specifically provided after the scene determining component extracts the scene identifier.

The event engine 204 is configured to obtain an event processing request triggered based on the target live streaming page, determine, according to the event processing request, an event needing to be processed, invoke a corresponding function plug-in, and process the event.

The UI management component 205 is configured to perform rendering on the preset basic page to obtain a functional structure needed by the corresponding function plug-ins, sequentially load corresponding function plug-ins according to the functional structure, and initialize the function plug-ins to obtain the target live streaming page.

The function plug-ins 206 respectively correspond to the function modules on the live streaming page, for example, bullet screen interaction, gift and reward giving, and live streaming counting. Corresponding events can be processed only after the function plug-ins are invoked.

The following describes, in detail based on the architecture of the server by way of example, a process performed by the server.

Figure 2B:
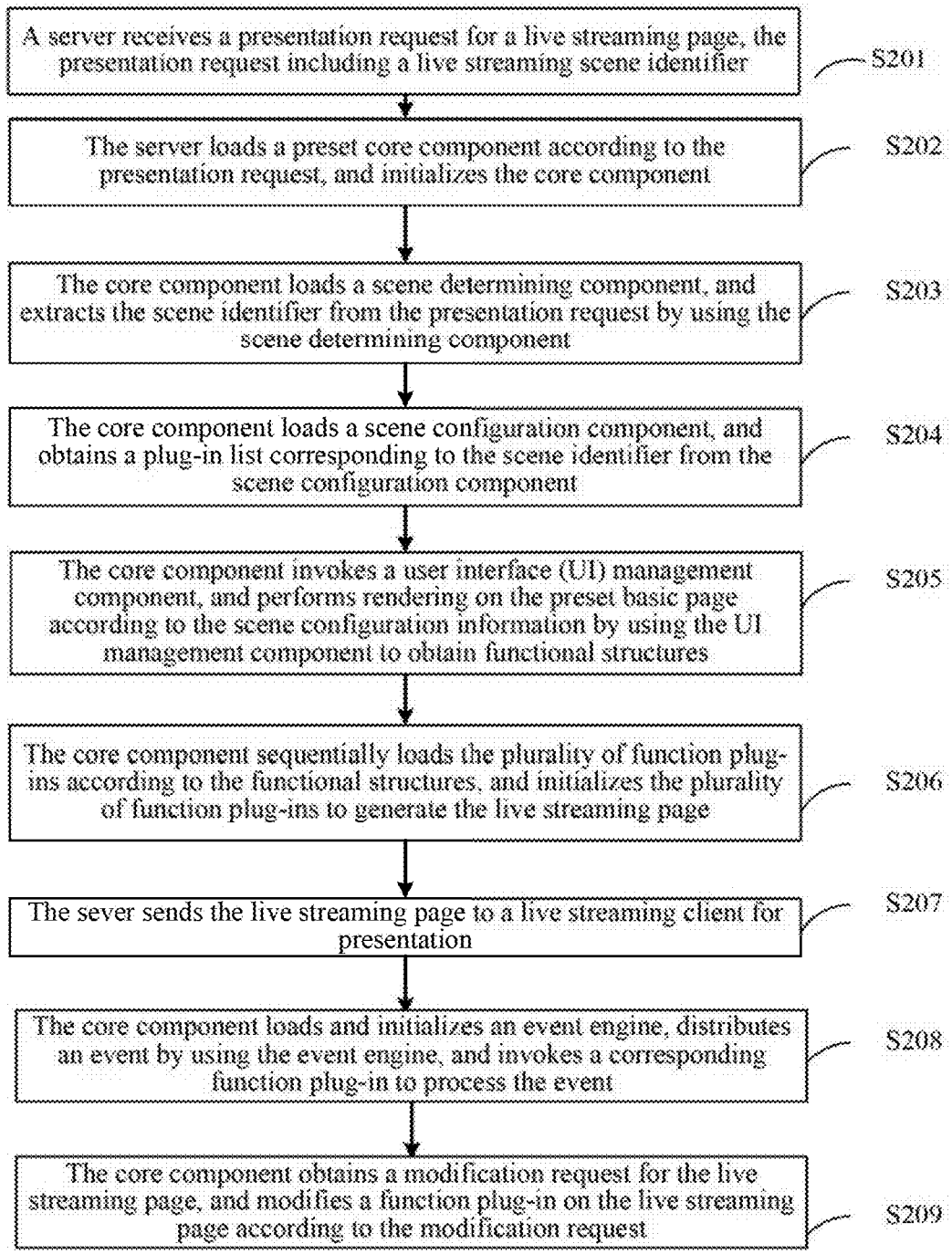
FIG. 2b is another flowchart of a data processing method for a live streaming page according to an embodiment of this application.

As shown in FIG. 2*b*, a specific process of a data processing method for a live streaming page may be as follows:

In S201, a server receives a presentation request for a live streaming page, the presentation request including a live streaming scene identifier.

The scene identifier is used to distinguish between and recognize different running environments of the live streaming page, and may specifically include information such as a name, a code, a number, and/or an icon of the scene. In some embodiments, the running environment may be a type of an application used for opening the live streaming page, for example, WeChat, Microblog, QQ, or a browser.

In S202, the server loads a preset core component according to the presentation request, and initializes the core component, and then, step S203 is performed.

In S203, the core component loads a scene determining component, extracts the scene identifier from the presentation request by using the scene determining component, and then, performs step S204.

In S204, the core component loads a scene configuration component, obtains a plug-in list corresponding to the scene identifier from the scene configuration component, and then, performs step S205.

For example, the scene configuration component includes two plug-in lists. A plug-in list 1 includes information about a live streaming function plug-in and information about a bullet screen interaction plug-in, and a plug-in list 2 includes information about a live streaming function plug-in, information about a bullet interaction plug-in, and information about a gift and reward giving plug-in.

If a scene identifier of a scene 1 is 001, and function plug-ins needing to be loaded in this scene include a live streaming function plug-in and a bullet interaction plug-in, in this case, the plug-in list 1 may be obtained from the scene configuration component according to the scene identifier "001".

If a scene identifier of a scene 2 is 002, and function plug-ins needing to be loaded in this scene include a live streaming function plug-in, a bullet interaction plug-in, and a gift and reward giving plug-in, in this case, the plug-in list 2 may be obtained from the scene configuration component according to the scene identifier "002", and so on.

S205. The core component invokes a UI management component, performs rendering on a preset basic page according to the plug-in list by using the UI management component to obtain functional structures, and performs step S206.

For example, still using the example in step S204, if the function plug-ins needing to be loaded are the "live streaming plug-in" and the "bullet screen interaction plug-in", in this case, rendering may be performed on the preset basic page according to the plug-in list 1 by using the UI management component, to obtain a functional structure needed by the "live streaming plug-in" and the "bullet screen interaction plug-in," and then, step S206 is performed.

Similarly, if the function plug-ins needing to be loaded are the "live streaming plug-in," the "bullet screen interaction plug-in," and the "gift and reward giving plug-in," in this case, rendering may be performed on the preset basic page according to the plug-in list 2 by using the UI management component, to obtain a functional structure needed by the "live streaming plug-in", the "bullet screen interaction plug-in," and the "gift and reward giving plug-in," and then, step S206 is performed, and so on.

The basic page is a live streaming page obtained before the function plug-ins provided in this embodiment of this application are loaded, and may be specifically set according to a requirement of an actual application, and details are not described herein again.

In S206, the core component sequentially loads the corresponding function plug-ins according to the functional structures, and initializes the function plug-ins to generate a live streaming page, and then, step S207 is performed.

Figure 2C:
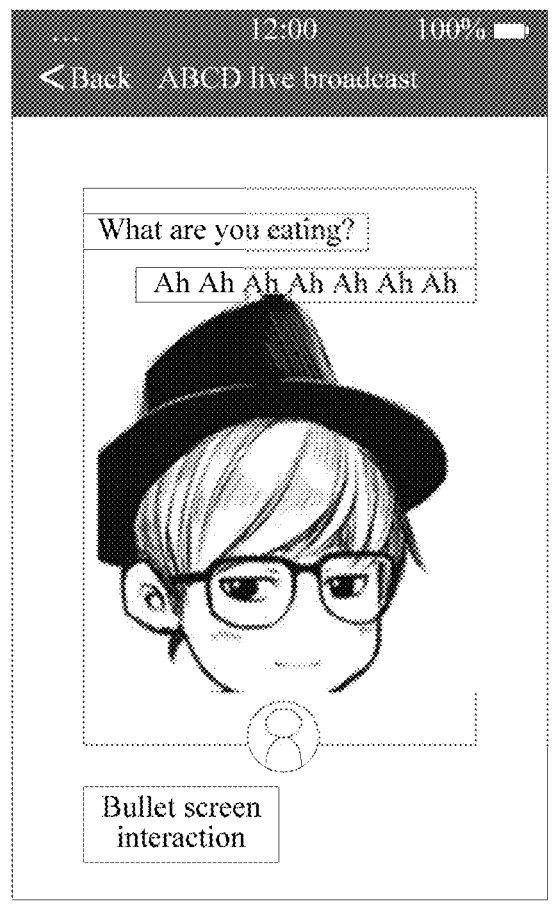
FIG. 2c is an exemplary diagram of a live streaming page in a data processing method for a live streaming page according to an embodiment of this application.

For example, if the functional structure needed by the "live streaming function plug-in" and the "bullet screen interaction plug-in" is obtained through rendering in step S205, the "live streaming plug-in" and the "bullet screen interaction plug-in" may be sequentially loaded according to the functional structure, and the function plug-ins are initialized, to obtain the target live streaming page. For example, referring to FIG. 2*c*, in addition to the "live streaming function plug-in", the "bullet screen interaction plug-in" is also loaded. Therefore, a corresponding bullet screen interaction function can be provided on the target live streaming page. In other words, the user may perform bullet screen interaction by triggering a "bullet screen interaction" key.

In another example, if the functional structure needed by the "live streaming plug-in", the "bullet screen interaction plug-in," and the "gift and reward giving plug-in" is obtained through rendering in step S205, the "live streaming plug-in," the "bullet screen interaction plug-in," and the "gift and reward giving plug-in" may be sequentially loaded according to the functional structure, and the function plug-ins are separately initialized.

In S207, the server sends the target live streaming page to a live streaming client for presentation.

Besides that the target live streaming page may be presented locally, the target live streaming page may be sent to each client for presentation. For example, the target live streaming page may be sent to a terminal to which the client belongs, so that the terminal presents the target live streaming page on a screen.

In addition, after the target live streaming page is presented, each event may be responded to by using each function plug-in on the target live streaming page. In other words, step S208 may further be performed as follows:

In S208, the core component loads and initializes an event engine, distributes an event by using the event engine, and invokes a corresponding function plug-in to process the event. For example, details may be as follows:

The event engine obtains an event processing request triggered based on the target live streaming page, determines, according to the event processing request, an event needing to be processed, triggers the core component to invoke a corresponding function plug-in, and processes the event by using the invoked function plug-in.

For example, using an example in which the event is "bullet screen interaction," in this case, the core component may be triggered to invoke the bullet screen interaction plug-in, the event is processed by using the bullet screen interaction plug-in, and the like.

In some embodiments, a plug-in on the target live streaming page may further be modified, for example, deleted or added. In other words, step S209 may further be performed as follows:

In S209, the core component obtains a modification request for the target live streaming page, where the modification request indicates a function plug-in needing to be modified, and modifies, for example, deletes or adds, a function plug-in on the live streaming page according to the modification request.

For example, if a "bullet screen interaction function" on the target live streaming page needs to be deleted, a modification request for the target live streaming page may be initiated, and then, the "bullet screen interaction plug-in" on the target live streaming page is deleted according to the modification request.

In another example, if a "bullet screen interaction function" needs to be added to the target live streaming page, a modification request for the target live streaming page may be initiated, and then, the corresponding "bullet screen interaction plug-in" is added to the target live streaming page according to the modification request.

A sequence of steps S208 and S209 may not be fixed, and details are not described herein.

As can be learned from the foregoing, in this embodiment, after the presentation request for the live streaming page and carrying the scene identifier is received, various components may be loaded to obtain the plug-in list corresponding to the scene identifier; then, the corresponding function plug-ins are loaded on the preset basic page according to the plug-in list, to obtain the target live streaming page, and the target live streaming page is presented. Compared with a related solution in which page differentiation can be implemented only by using hard code, because in this solution, different function plug-in can be flexibly loaded according to different scene requirements, to generate different live streaming pages, implementation is simpler and more flexible, development time can be greatly reduced, and the processing efficiency is improved.

For example, a live streaming page of a live streaming client A may provide only a basic live streaming watching capability, and in addition to the live streaming watching function, a live streaming page of a live streaming client B may further provide various interaction functions.

In addition, compared with the related solution, in this application, because the function plug-ins can be flexibly deleted from or added to the live streaming page, when another function needs to be added or a scene needs to be changed, code does not need to be re-written to develop a new live streaming page, and an effect of scene differentiation can be achieved, thereby adapting to constantly-changing scenes and requirements more quickly.

Figure 3A:
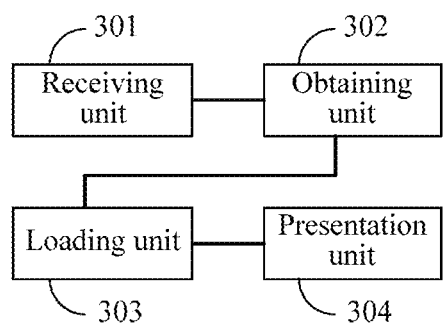
FIG. 3a is a schematic structural diagram of a data processing apparatus for a live streaming page according to an embodiment of this application.

To better implement the foregoing method, an embodiment of this application further provides a data processing apparatus for a live streaming page, briefly referred to as a data processing apparatus. As shown in FIG. 3a, the data processing apparatus may include a receiving unit 301, an obtaining unit 302, a loading unit 303, and a presentation unit 304.

The receiving unit 301 is configured to receive a presentation request for a live streaming page, where the presentation request carries a scene identifier.

The scene identifier is used to distinguish between and recognize different running environments of the live streaming page, and may specifically include information such as a name, a code, a number, and/or an icon of the scene. In some embodiments, the running environment may be a type of an application used for opening the live streaming page, for example, WeChat, Microblog, QQ, or a browser.

The obtaining unit 302 is configured to obtain scene configuration information corresponding to the scene identifier.

For example, the obtaining unit 302 may include a loading subunit and an obtaining subunit.

The loading subunit is configured to load a preset core component according to the presentation request.

The obtaining subunit is configured to obtain the scene configuration information corresponding to the scene identifier by using the core component.

For example, the obtaining subunit may be specifically configured to extract the scene identifier from the presentation request by using the core component, and obtain the scene configuration information corresponding to the scene identifier.

In some embodiments, a scene determining component and a scene configuration component may be separately set to perform the operations.

In other words, the obtaining subunit may be specifically configured to load the scene determining component by using the core component, extract the scene identifier from the presentation request by using the scene determining component, load the scene configuration component, and obtain the scene configuration information corresponding to the scene identifier from the scene configuration component.

Figure 3B:
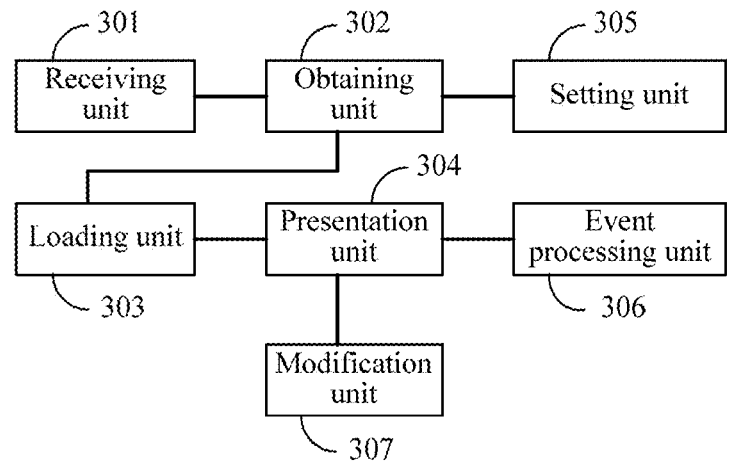
FIG. 3b is another schematic structural diagram of a data processing apparatus for a live streaming page according to an embodiment of this application.

A correspondence between the scene configuration information and the scene identifier may be pre-stored in the data processing apparatus for a live streaming page, or the data processing apparatus for a live streaming page may establish a correspondence between the scene configuration information and the scene identifier. In other words, as shown in FIG. 3b, the data processing apparatus may further include a setting unit 305.

The setting unit 305 may be configured to obtain a scene setting request, where the scene setting request carries the scene identifier, obtain multiple pieces of function plug-in information according to the scene setting request, receive function plug-in information selected by a user from the multiple pieces of function plug-in information, generate the scene configuration information according to the selected function plug-in information, and establish the correspondence between the scene configuration information and the scene identifier.

In this case, the obtaining unit 302 may be specifically configured to obtain, based on the correspondence established by the setting unit 305 between the scene configuration information and scene identifier, the scene configuration information corresponding to the scene identifier.

The loading unit 303 is configured to load corresponding function plug-ins on a preset basic page according to the scene configuration information, to obtain a target live streaming page.

For example, the loading unit 303 may include a rendering subunit and a processing subunit.

The rendering subunit may be configured to perform rendering on the preset basic page according to the scene configuration information, to obtain a functional structure needed by the corresponding function plug-ins.

For example, the rendering subunit may be specifically configured to invoke a UI management component, and perform rendering on the preset basic page according to the scene configuration information by using the UI management component, to obtain the functional structure needed by the corresponding function plug-ins.

The basic page may be specifically set according to a requirement of an actual application, and details are not described herein.

The processing subunit may be configured to sequentially load corresponding function plug-ins according to the functional structure, and initialize the function plug-ins to obtain the target live streaming page.

The presentation unit 304 is configured to present the target live streaming page.

For example, besides that the target live streaming page may be presented locally, the presentation unit 304 may further send the target live streaming page to each client for presentation. For example, the target live streaming page may be sent to a terminal to which the client belongs, so that the terminal presents the target live streaming page on a screen.

In addition, after the target live streaming page is presented, each event may be responded to by using each function plug-in on the target live streaming page. In other words, as shown in FIG. 3b, the data processing apparatus may further include an event processing unit 306.

The event processing unit 306 may be configured to obtain an event processing request triggered based on the target live streaming page, determine, according to the event processing request, an event needing to be processed, invoke a corresponding function plug-in, and process the event by using the invoked function plug-in.

In some embodiments, a plug-in on the target live streaming page may further modified, for example, deleted or added. In other words, as shown in FIG. 3b, the data processing apparatus may further include a modification unit 307.

The modification unit 307 may be configured to obtain a modification request triggered based on the target live streaming page, where the modification request indicates a function plug-in needing to be deleted or added, and delete the function plug-in from or add the function plug-in to the target live streaming page according to the modification request.

During specific implementation, the units may be implemented as independent entities, or may be combined in any form and implemented as a same entity or a plurality of entities. For specific implementation of the units, refer to the embodiments described above, and details are not described herein again.

The data processing apparatus may be specifically integrated into a device such as a server.

As can be learned from the foregoing, in the data processing apparatus in this embodiment, after the presentation request for the live streaming page and carrying the scene identifier is received, the obtaining unit 302 may obtain the scene configuration information corresponding to the scene identifier; then, the loading unit 303 may load the corresponding function plug-ins on the preset basic page according to the scene configuration information, to obtain the target live streaming page, and the presentation unit 304 presents the target live streaming page. Compared with a related solution in which page differentiation can be implemented only by using hard code, because in this solution, different function plug-in can be flexibly loaded according to different scene requirements to generate different live streaming pages, implementation is simpler and more flexible, development time can be greatly reduced, and the processing efficiency is improved.

Correspondingly, an embodiment of this application further provides a data processing system for a live streaming page, including any data processing apparatus for a live streaming page provided in the embodiments of this application. For details, refer to the foregoing embodiment. The data processing apparatus may be specifically integrated into a server. For example, details may be as follows:

The server is configured to receive a presentation request for a live streaming page, where the presentation request carries a scene identifier, and the scene identifier is determined by a live streaming client according to a running environment of the live streaming client; obtain scene configuration information corresponding to the scene identifier, where the scene configuration information includes a correspondence between the scene identifier and corresponding function plug-ins; load the function plug-ins corresponding to the scene identifier on a preset basic page according to the scene configuration information, to obtain a target live streaming page; and send the target live streaming page to the live streaming client for presentation.

For example, the server may be specifically configured to load a preset core component according to the presentation request, load a scene determining component by using the core component, extract the scene identifier from the presentation request by using the scene determining component, load a scene configuration component, obtain the scene configuration information corresponding to the scene identifier from the scene configuration component, invoke a UI management component, perform rendering on the preset basic page according to the scene configuration information by using the UI management component, to obtain a functional structure needed by the corresponding function plug-ins, sequentially load the corresponding function plug-ins according to the functional structure, and initialize the function plug-ins to obtain the target live streaming page.

A correspondence between the scene configuration information and the scene identifier may be pre-stored in the data processing apparatus for a live streaming page, or the data processing apparatus for a live streaming page may establish a correspondence between the scene configuration information and the scene identifier. In other words:

The server may further be configured to obtain a scene setting request, where the scene setting request carries the scene identifier, obtain multiple pieces of function plug-in information according to the scene setting request, receive function plug-in information selected by a user from the multiple pieces of function plug-in information, generate the scene configuration information according to the selected function plug-in information, and establish the correspondence between the scene configuration information and the scene identifier.

In addition, after the target live streaming page is presented, each event may be responded to by using each function plug-in on the target live streaming page. In other words:

The server may further be configured to obtain an event processing request triggered based on the target live streaming page, determine, according to the event processing request, an event needing to be processed, invoke a corresponding function plug-in, and process the event by using the invoked function plug-in.

In some embodiments, a plug-in on the target live streaming page may further be modified, for example, deleted or added. In other words:

The server may further be configured to obtain a modification request triggered based on the target live streaming page, where the modification request indicates a function plug-in needing to be deleted or added, and delete the function plug-in from or add the function plug-in to the target live streaming pace according to the modification request.

In addition, the data processing system for a live streaming pace may further include another device, for example, may include a client. The client may be specifically integrated into a terminal.

The terminal may be configured to receive the target live streaming page sent by the server, and present the target live streaming page.

For specific implementations of the foregoing devices, refer to the foregoing embodiments, and details are not described herein again.

Because the data processing system for a live streaming page may include any data processing apparatus for a live streaming page provided in the embodiments of this application, the data processing system for a live streaming page can implement beneficial effects that can be implemented by any data processing apparatus for a live streaming page provided in the embodiments of this application. For the details, refer to the foregoing embodiments, and details are not described herein again.

Figure 4:
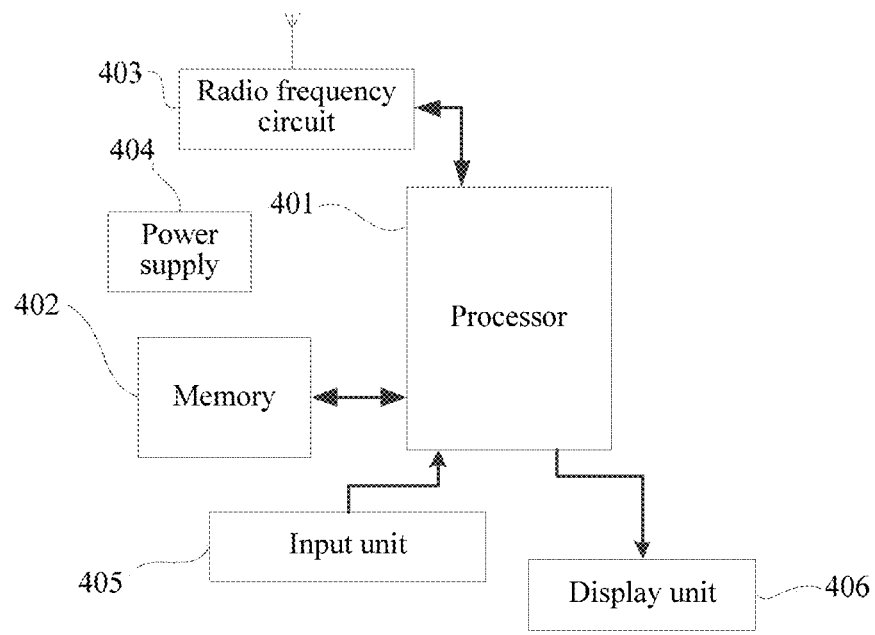
FIG. 4 is a schematic structural diagram of a server according to an embodiment of this application.

An embodiment of this application further provides a server. As shown in FIG. 4, FIG. 4 is a schematic structural diagram of the server used in the embodiments of this application. Specifically:

The server may include a processor/processing circuitry 401 having one or more processing cores, a non-transitory computer-readable memory 402 having one or more computer readable storage mediums, a radio frequency (RF) circuit 403, a power supply 404, an input unit 405, a display unit 406, and the like. A person skilled in the art may understand that the structure of the server shown in FIG. 4 does not constitute a limitation to the server, and may include more or fewer components than those shown in the figure, or some components may be combined, or different component arrangements may be used.

The processor 401 is a control center of the server, is connected to various parts of the server by using various interfaces and lines, and performs various functions of the server and processes data by running or executing a software program and/or a module stored in the memory 402 and invoking data stored in the memory 402, to perform overall monitoring on the server. In some embodiments, the processor 401 may include one or more processing cores, and preferably, the processor 401 may integrate an application processor and a modem processor. The application processor mainly processes an operating system, a user interface, an application program, and the like, and the modem processor mainly processes wireless communication. It may be understood that the foregoing modem processor may either not be integrated into the processor 401.

The memory 402 may be configured to store a software program and module. The processor 401 runs the software program and module stored in the memory 402, to implement various functional applications and data processing. The memory 402 mainly may include a program storage region and a data storage region. The program storage region may store an operating system, an application (for example, a voice playback function, or an image playback function) required by at least one function, and the like, and the data storage region may store data created according to use of the server, and the like. In addition, the memory 402 may include a high speed random access memory, and may also include a non-volatile memory, such as at least one magnetic disk storage device, a flash memory, or another volatile solid-state storage device. Correspondingly, the memory 402 may further include a memory controller, so that the processor 401 accesses the memory 402.

The RF circuit 403 may be configured to receive and send signals in an information receiving and transmitting process. Especially, after receiving downlink information of a base station, the RF circuit 73 delivers the downlink information to the one or more processors 401 for processing, and in addition, sends related uplink data to the base station. Generally, the RF circuit 403 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 403 may also communicate with a network and another device by wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The server further includes the power supply 404 (such as, a battery) for supplying power to the components. Preferably, the power supply 404 may be logically connected to the processor 401 by using a power management system, thereby implementing functions such as charging, discharging and power consumption management by using the power management system. The power supply 404 may further include one or more of a direct current or alternating current power supply, a re-charging system, a power failure detection circuit, a power supply converter or inverter, a power supply state indicator, and any other components.

The server may further include the input unit 405. The input unit 405 may be configured to receive input digit or character information, and generate a keyboard, mouse, joystick, optical, or track ball signal input related to user settings and functional control. Specifically, in a specific embodiment, the input unit 405 may include a touch sensitive surface and another input device. The touch sensitive surface, which may also be referred to as a touchscreen or a touch panel, may collect a touch operation of a user on or near the touch sensitive surface (such as an operation of a user on or near the touch sensitive surface by using any suitable object or accessory such as a finger or a stylus), and drive a corresponding connection apparatus according to a preset program. In some embodiments, the touch-sensitive surface may include a touch detection apparatus and a touch controller. The touch detection apparatus detects a touch position of the user, detects a signal generated by the touch operation, and transfers the signal to the touch controller.

The touch controller receives the touch information from the touch detection apparatus, converts the touch information into touch point coordinates, and sends the touch point coordinates to the processor 401. Moreover, the touch controller can receive and execute a command sent from the processor 401. In addition, the touch-sensitive surface may be a resistive, capacitive, infrared, or surface sound wave type touch-sensitive surface. In addition to the touch-sensitive surface, the input unit 405 may further include another input device. Specifically, the another input device may include, but is nor limited to, one or more of a physical keyboard, a functional key (such as a volume control key or a switch key), a track ball, a mouse, and a joystick.

The server may further include a display unit 406. The display unit 406 may be configured to information input by the user or information provided for the user, and various graphical interfaces of the server. The graphical interfaces may be formed by a graphic, a text, an icon, a video, and any combination thereof. The display unit 406 may include a display panel, and in some embodiments, the display panel may be configured in a form of a liquid crystal display (LCD), an organic light-emitting diode (OLED), or the like. Further, the touch-sensitive surface may cover the display panel. After detecting a touch operation on or near the touch-sensitive surface, the touch-sensitive surface transfers the touch operation to the processor 401, so as to determine the type of the touch event. Then, the processor 401 provides a corresponding visual output on the display panel 141 according to the type of the touch event. Although in FIG. 4, the touch-sensitive surface and the display panel are used as two separate parts to implement input and output functions, in some embodiments, the touch-sensitive surface and the display panel may be integrated to implement the input and output functions.

Although not shown in the figure, the server may further include a camera, a Bluetooth module, and the like, and details are not described herein. Specifically, in this embodiment, the processor 401 in the server loads executable files corresponding to processes of the one or more applications to the memory 402 according to the following instructions, and the processor 401 runs the applications in the memory 402, to implement various functions. Details are as follows:

receiving a presentation request for a live streaming page, where the presentation request carries a scene identifier, and the scene identifier is determined by a live streaming client according to a running environment of the live streaming client; obtaining scene configuration information corresponding to the scene identifier, where the scene configuration information includes a correspondence between the scene identifier and corresponding function plug-ins; loading the function plug-ins corresponding to the scene identifier on preset basic page according to the scene configuration information, to obtain a target live streaming page; and sending the target live streaming page to the live streaming client for presentation.

For example, the server may specifically load a preset core component according to the presentation request, load a scene determining component by using the core component, extract the scene identifier from the presentation request by using the scene determining component, load a scene configuration component, obtain the scene configuration information corresponding to the scene identifier from the scene configuration component, invoke a UI management component, perform rendering on the preset basic page according to the scene configuration information by using the UI management component, to obtain a functional structure needed by the corresponding function plug-ins, sequentially load the corresponding function plug-ins according to the functional structure, and initialize the function plug-ins to obtain the target live streaming page.

A correspondence between the scene configuration information and the scene identifier may be pre-stored in the data processing apparatus for a live streaming page, or the data processing apparatus for a live streaming page may establish a correspondence between the scene configuration information and the scene identifier. In other words, the application program stored in the memory 402 may further implement the following functions:

obtaining a scene setting request, where the scene setting request carries the scene identifier, obtaining multiple pieces of function plug-in information according to the scene setting request, receiving function plug-in information selected by a user from the multiple pieces of function plug-in information, generating the scene configuration information according to the selected function plug-in information, and establishing the correspondence between the scene configuration information and the scene identifier.

In addition, after the target live streaming page is presented, each event may be responded to by using each function plug-in on the target live streaming page. In other words, the application program stored in the memory 402 may further implement the following functions:

obtaining an event processing request triggered based on the target live streaming page, determining, according to the event processing request an event needing to be processed, invoking a corresponding function plug-in, and processing the event by using the invoked function plug-in.

In some embodiments, a plug-in on the target live streaming page may further be modified, for example, deleted or added. In other words, the application program stored in the memory 402 may further implement the following functions:

obtaining a modification request triggered based on the target live streaming page, where the modification request indicates a function plug-in needing to be deleted or added, and deleting the function plug-in from or adding the function plug-in to the target live streaming page according to the modification request.

Figure 5:
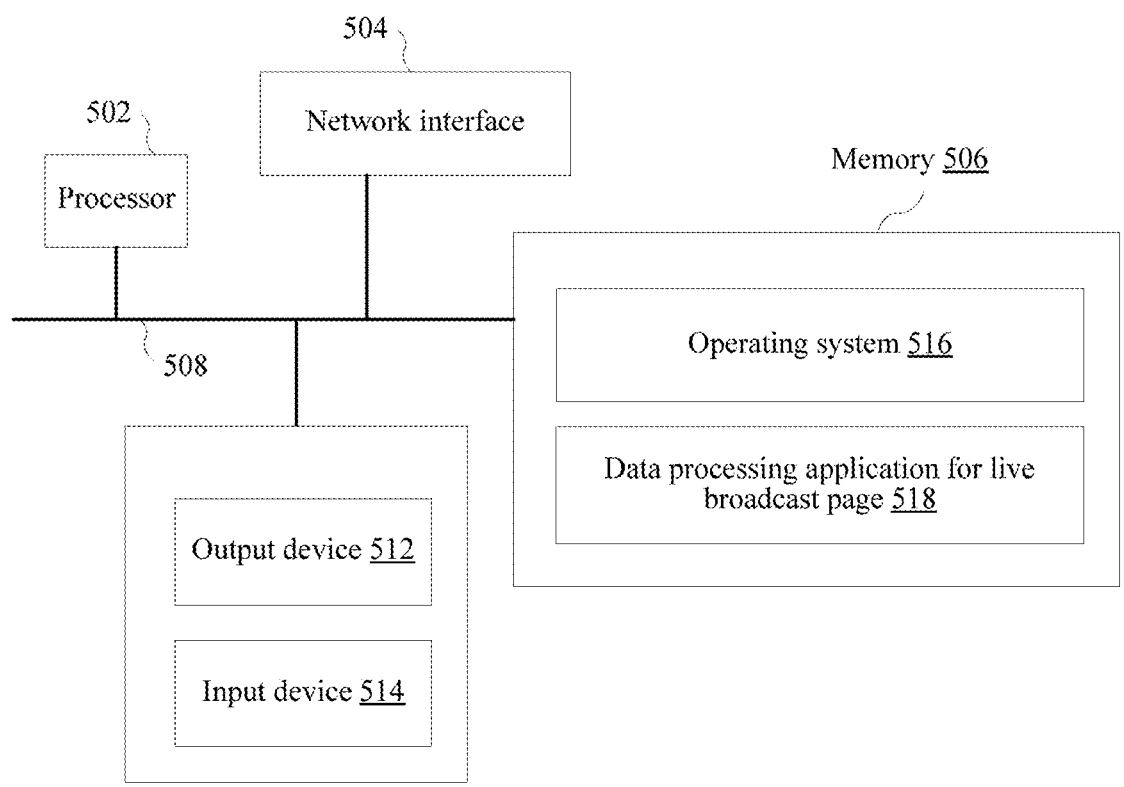
FIG. 5 is another schematic structural diagram of a server according to an embodiment of this application.

FIG. 5 is another schematic structural diagram of a server according to an embodiment of this application. As shown in FIG. 5, the server 500 includes:

one or more processors (CPU) 502, a network interface 504, a non-transitory computer-readable memory 506, and a communications bus 508 configured to connect the components.

In some embodiments, the network interface 504 is configured to implement a network connection between the server 500 and an external device, for example, receive a presentation request from a live streaming client, and send a target live streaming page to the live streaming client.

The server 500 may further include one or more output devices 512 (for example, a touchscreen and a display), and/or one or more input, devices 514 (for example, a touch screen, a stylus, or another input control).

The non-transitory, computer-readable memory 506 may be a high-speed random access memory, for example, a DRAM, an SRAM, a DDR RAM, or another random access solid-state storage device; or a non-volatile memory, for example, one or more magnetic storage devices, an optical disc storage device, a flash memory, or another non-volatile solid-state storage device.

The memory 506 includes:

an operating system 516, including a program configured to process various basic system services and execute a hardware-related task; and a data processing application 518 for a live streaming page, configured to receive a presentation request for a live streaming page, where the presentation request carries a scene identifier, and the scene identifier is determined by a live streaming client according to a running environment of the live streaming client; obtain scene configuration information corresponding to the scene identifier, where the scene configuration information includes a correspondence between the scene identifier and corresponding function plug-ins; load the function plug-ins corresponding to the scene identifier on a preset basic page according to the scene configuration information, to obtain a target live streaming page; and send the target live streaming page to the live streaming client for presentation.

As can be learned from the foregoing, in the server in this embodiment, after the presentation request for the live streaming page and carrying the scene identifier is received, the scene configuration information corresponding to the scene identifier may be obtained; then, the corresponding function plug-ins are loaded on the preset basic page according to the scene configuration information, to obtain the target live streaming page, and the target live streaming page is presented. Compared with a related solution in which page differentiation can be implemented only by using hard code, because in this solution, different function plug-in can be flexibly loaded according to different scene requirements to generate different live streaming pages, implementation is simpler and more flexible, development time can be greatly reduced, and the processing efficiency is improved.

A person of ordinary skill in the art may understand that all or some of the steps of the methods in the embodiments may be implemented by a program instructing relevant hardware. The program may be stored in a computer readable storage. The storage may include a flash memory, a read-only memory (ROM), a random access memory (RAM), a magnetic disk, and an optical disc.

The data processing method, apparatus, and system for a live streaming page that are provided in the embodiments of this application are described in detail above. The principle and implementation of this application are described herein through specific examples. The description of the embodiments is merely provided to help understand the method and core ideas of this application. In addition, a person of ordinary skill in the art can make variations and modifications in terms of the specific implementations and application scopes according to the ideas of this application. Therefore, the content of this specification shall not be construed as a limitation to this application.

What is claimed is:

1. A data processing method for a live streaming page, applied to a live streaming server, comprising:

receiving a presentation request for the live streaming page, the presentation request including a live streaming scene identifier, the live streaming scene identifier being determined by a live streaming client according to a running environment of the live streaming client;

obtaining scene configuration information corresponding to the live streaming scene identifier, the scene configuration information indicating at least one of a plurality of function plug-ins, the plurality of function plug-ins being configured to display different content types and provide predetermined functions for the different content types to a user during display of live streaming content;

determining which of the plurality of function plug-ins is to be included in the live streaming page based on the at least one of the plurality of function plug-ins indicated by the obtained scene configuration information;

generating the live streaming page, by circuitry of the live streaming server, by adding the indicated at least one of the plurality of function plug-ins identified as corresponding to the live streaming scene identifier on a preset basic page that includes the live streaming content according to the scene configuration information; and sending the live streaming page with the added at least one of the plurality of function plug-ins to the live streaming client for presentation, wherein at least two of the plurality of function plug-ins are identified as corresponding to the live streaming scene identifier and added on the preset basic page.

2. The method according to claim 1, wherein the running environment includes an application used for running the live streaming page in the live streaming client, and the live streaming scene identifier indicates an application type of the application.

3. The method according to claim 1, wherein the obtaining comprises:

loading a preset core component according to the presentation request; and obtaining the scene configuration information corresponding to the live streaming scene identifier by using the preset core component.

4. The method according to claim 3, wherein the obtaining the scene configuration information corresponding to the live streaming scene identifier by using the preset core component comprises:

loading a scene determining component by using the preset core component;

extracting the live streaming scene identifier from the presentation request by using the scene determining component, and loading a scene configuration component; and obtaining the scene configuration information corresponding to the live streaming scene identifier from the scene configuration component.

5. The method according to claim 1, wherein the generating comprises:

performing rendering on the preset basic page according to the scene configuration information to obtain functional structures corresponding to the plurality of function plug-ins; and sequentially loading the plurality of function plug-ins according to the functional structures, and initializing the plurality of function plug-ins to generate the live streaming page.

6. The method according to claim 5, wherein the performing comprises:

invoking a user interface (UI) management component; and performing the rendering on the preset basic page according to the scene configuration information by using the UI management component to obtain the functional structures.

7. The method according to claim 1, wherein after the sending, the method further comprises:

receiving an event processing request triggered based on the live streaming page, the event processing request including an upcoming event;

invoking another function plug-in of the plurality of function plug-ins corresponding to the upcoming event; and processing the upcoming event by using the invoked other function plug-in.

8. The method according to claim 1, wherein before the receiving, the method further comprises:

obtaining a live streaming scene setting request, the live streaming scene setting request including the live streaming scene identifier;

obtaining multiple pieces of function plug-in information according to the live streaming scene setting request;

receiving function plug-in information selected by the user from the multiple pieces of function plug-in information; and generating the scene configuration information according to the selected function plug-in information, and establishing a correspondence between the scene configuration information and the live streaming scene identifier.

9. The method according to claim 1, wherein after the sending, the method further comprises:

receiving a modification request for the live streaming page, the modification request indicating deleting one of the at least one of the plurality of function plug-ins or adding another function plug-in; and deleting the one of the at least one of the plurality of function plug-ins or adding the other function plug-in to the live streaming page according to the modification request.

10. A data processing apparatus for a live streaming page, comprising:

a memory;

processing circuitry coupled to the memory and configured to receive a presentation request for the live streaming page, the presentation request including a live streaming scene identifier, the live streaming scene identifier being determined by a live streaming client according to a running environment of the live streaming client;

obtain scene configuration information corresponding to the live streaming scene identifier, the scene configuration information indicating at least one of a plurality of function plug-ins, the plurality of function plug-ins being configured to display different content types and provide predetermined interactivity functions for the different content types to a user during display of live streaming content;

determine which of the plurality of function plug-ins is to be included in the live streaming page based on the at least one of the plurality of function plug-ins indicated by the obtained scene configuration information;

generate the live streaming page by adding the indicated at least one of the plurality of function plug-ins identified as corresponding to the live streaming scene identifier on a preset basic page that includes the live streaming content according to the scene configuration information; and send the live streaming page with the added at least one of the plurality of function plug-ins to the live streaming client for presentation, wherein at least two of the plurality of function plug-ins are identified as corresponding to the live streaming scene identifier and added on the preset basic page.

11. The apparatus according to claim 10, wherein the running environment includes an application used for running the live streaming page in the live streaming client, and the live streaming scene identifier indicates an application type of the application.

12. The apparatus according to claim 10, wherein the processing circuitry is further configured to load a preset core component according to the presentation request; and obtain the scene configuration information corresponding to the live streaming scene identifier by using the preset core component.

13. The apparatus according to claim 12, wherein the processing circuitry is further configured to load a scene determining component by using the preset core component;

extract the live streaming scene identifier from the presentation request by using the scene determining component, and load a scene configuration component; and obtain the scene configuration information corresponding to the live streaming scene identifier from the scene configuration component.

14. The apparatus according to claim 10, wherein the processing circuitry is further configured to perform rendering on the preset basic page according to the scene configuration information to obtain functional structures corresponding to the plurality of function plug-ins; and sequentially load the plurality of function plug-ins according to the functional structures, and initialize the plurality of function plug-ins to generate the live streaming page.

15. The apparatus according to claim 14, wherein the processing circuitry is further configured to invoke a user interface (UI) management component; and perform the rendering on the preset basic page according to the scene configuration information by using the UI management component to obtain the functional structures.

16. The apparatus according to claim 10, wherein the processing circuitry is further configured to receive an event processing request triggered based on the live streaming page, the event processing request including an upcoming event;

invoke another function plug-in corresponding to the upcoming event; and process the upcoming event by using the invoked other function plug-in.

17. The apparatus according to claim 10, wherein the processing circuitry is further configured to obtain a live streaming scene setting request, the live streaming scene setting request including the live streaming scene identifier;

obtain multiple pieces of function plug-in information according to the live streaming scene setting request;

receive function plug-in information selected by the user from the multiple pieces of function plug-in information; and generate the scene configuration information according to the selected function plug-in information, and establish a correspondence between the scene configuration information and the live streaming scene identifier.

18. The apparatus according to claim 10, wherein the processing circuitry is further configured to receive a modification request for the live streaming page, the modification request indicating deleting one of the at least one of the plurality of function plug-ins or adding another function plug-in; and delete the one of the at least one of the plurality of function plug-ins or add the other function plug-in to the live streaming page according to the modification request.

19. A data processing system for the live streaming page, comprising the data processing apparatus for the live streaming page according to claim 10.

20. A non-transitory computer-readable storage medium, the storage medium storing a program executable by a processor to perform:

receiving a presentation request for a live streaming page, the presentation request including a live streaming scene identifier, the live streaming scene identifier being determined by a live streaming client according to a running environment of the live streaming client;

obtaining scene configuration information corresponding to the live streaming scene identifier, the scene configuration information indicating at least one of a plurality of function plug-ins, the plurality of function plug-ins being configured to display different content types and provide predetermined interactivity functions for the different content types to a user during display of live streaming content;

determining which of the plurality of function plug-ins is to be included in the live streaming page based on the at least one of the plurality of function plug-ins indicated by the obtained scene configuration information;

generating the live streaming page by adding the indicated at least one of the plurality of function plug-ins identified as corresponding to the live streaming scene identifier on a preset basic page that includes the live streaming content according to the scene configuration information; and sending the live streaming page with the added at least one of the plurality of function plug-ins to the live streaming client for presentation, wherein at least two of the plurality of function plug-ins are identified as corresponding to the live streaming scene identifier and added on the preset basic page.

\* \* \* \* \*